Dec. 8, 1959        G. BATTISTONI        2,916,404
PROCESS FOR EXTRACTING SUGAR FROM MOLASSES
Filed Dec. 2, 1955
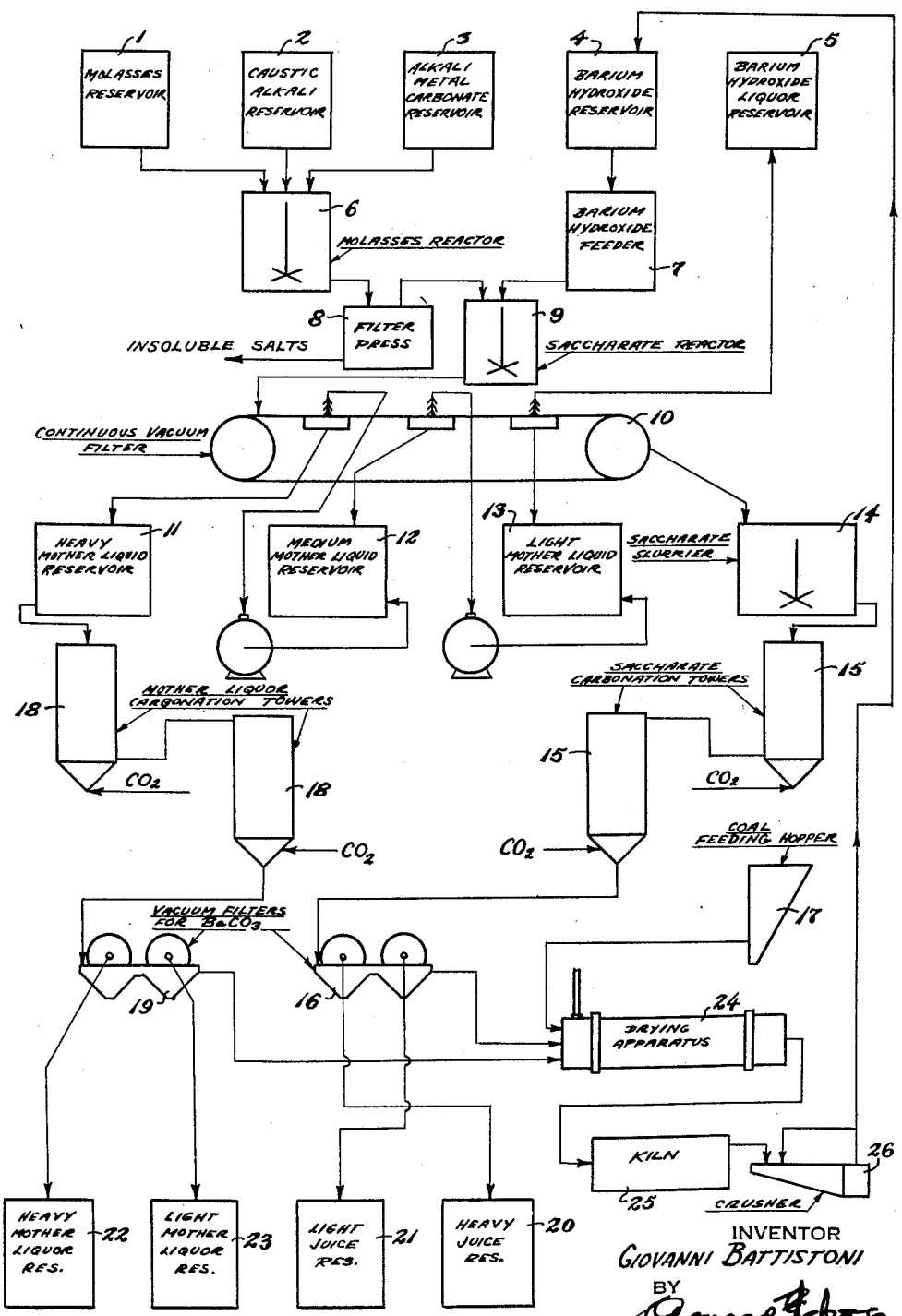
INVENTOR
GIOVANNI BATTISTONI
BY
ATTORNEY

2,916,404

PROCESS FOR EXTRACTING SUGAR FROM MOLASSES

Giovanni Battistoni, Milan, Italy

Application December 2, 1955, Serial No. 550,789

Claims priority, application Italy December 6, 1954

8 Claims. (Cl. 127—47)

A method is already known and widely used for extracting sugar from molasses, and consists in precipitating the saccharose, forming 48 to 50% of the contents, in the form of insoluble barium saccharate.

The barium saccharate is precipitated by pouring the molasses without agitation upon a 23 to 24% solution of barium oxide.

The purpose is to obtain agglomeration of crystals as coarse and uniform as possible so as to be able to decant the mother liquors therefrom and to wash them in a most simple and easy manner.

After subsequent discharging by hand and suspending in sugar juice, barium is displaced with carbon dioxide and precipitated as an insoluble carbonate. Then the carbonate is separated from the sugar solution in filter presses, and after separating it is washed, dried and subsequently mixed with an amount of anthracite coal as needed to obtain, in so-called electric block furnaces, the barium oxide. The solution of the latter, after being decanted and filtered, is recycled.

The mother liquors coming from the crystallization of the saccharate also have to be treated with carbon dioxide. In fact they still contain, in addition to all the non-sugar substances belonging to the molasses, an excess of about 40% of barium hydroxide, necessary for obtaining, under the conditions set forth above, the nearly complete precipitation of the saccharate.

However, since the carbon dioxide alone does not displace all of the barium present, it is also necessary to add in solution an alkali carbonate which usually is the potassium carbonate obtained from the final combustion of the previously concentrated mother liquors.

In the above described method there are a great number of defects and inconveniences of both chemical and technological in character, which result in losses of 7 to 9% of sugar and of 9 to 10% of barium carbonate (such percentages being based on the total of sugar extracted).

Most of the loss of barium carbonate is certainly due to the presence, in the molasses, of salts, above all of calcium, which in passing over into the mother liquor precipitate with barium in the form of insoluble carbonates. Hence the medium grade of barium carbonate as obtained by mixing the two products coming from both the saccharate and the mother liquor, is never higher than 94 to 95% of $BaCO_3$.

In the subsequent treatment in the electric furnace, the impurities of the anthracite coal and of the carbon electrodes are added to those of the medium grade of barium carbonate while obtaining the barium oxide.

It is evident that all these impurities, which not only are not eliminated during the treatment in the electric furnace but which in part also pollute barium, are only separated from the hydroxide solution in the form of an insoluble mud.

Further, the barium oxide, in addition to all the above mentioned heterogeneous substances, also contains insoluble barium salts which are separated in the hydroxide solution together with the other foreign substances and are lost with the mud.

Moreover, during the treatment in the electric furnace, which requires the handling of great quantities of powdery substances, it is quite difficult to avoid even purely mechanical losses.

Further, the manner in which the known process achieves the formation of the saccharate crystals while at rest, and the manner in which such crystals are filtered and washed are not rational and result in the following disadvantages:

The concentration of barium oxide in the hydroxide solution is limited;

Neither complete nor uniform intermittent mixing of the two liquids having very different viscosities can be obtained;

The yield of saccharate cannot be high in the mother liquor and significant percentages of the sugar are lost;

A satisfactory result, under these conditions, can be obtained only with a relatively high excess of barium hydroxide, so that it is necessary to produce a very substantial surplus of barium oxide;

By reason of variations in the molasses, the structure of the grains of the saccharate crystals will not be uniform, and such crystals leak and are difficult to wash if the grains are of small size;

In the mass of crystals, the granules are not of uniform size, being relatively large in the upper part of the mass and diminishing in size toward the bottom and center of the mass, thereby preventing regular washing and decanting;

As the grain size of the crystals increases, increased amounts of the mother liquor are trapped in the interstices between the agglomerated crystals and cannot be removed by washing;

From such a polluted saccharate it is not possible to obtain a juice having a purity of greater than 94 to 95 percent; and The crystallization, separation of the mother liquor, washing of the saccharate and the hand discharging thereof, as in the existing process, require much equipment, time, labor and supervision and, therefore, such operations are costly to install and operate.

It will also be noted that the electric furnaces used with the existing process are of an obsolete kind having a relatively small capacity and a highly complicated structure, so that the relatively high expenditure of labor needed to operate such furnaces results in a relatively high manufacturing cost.

An object of the present invention is to provide a relatively simple process for extracting sugar from molasses, while avoiding all of the above mentioned disadvantages of the existing process.

In accordance with this invention, the molasses to be desugared is treated in such a way as to initially separate from the molasses all those mineral salts which in the course of subsequent treatment would cause formation of insoluble carbonates.

In order to effect the desired initial separation of the mineral salts whose carbonates are insoluble, the molasses, while being conveniently heated and agitated, has added thereto a solution of any alkali carbonate in stoichiometrically sufficient amount to precipitate said salts in the presence of a caustic alkali.

It is particularly convenient to employ the potassium salt obtained from the combustion of the mother liquor coming from the treatment of sugar juices, as the alkali carbonate for initially separating from the molasses those mineral salts which would cause insoluble carbonates.

On having thus obtained the precipitation of the salts, the insoluble carbonates are separated from the molasses by decanting or by filtering or by centrifuging. The molasses resulting have a content of about 40 to 50% of water and are already heated and ready for subsequent treatment.

Thereafter, the barium carbonate that separates in the saccharate as well as in the mother liquor has a purity of about 99% of $BaCO_3$.

If to this practically pure carbonate there is added, for reduction, some carbon of similar purity—as is available, e.g. in the form of petroleum coke—there is obtained, with better yield, an oxide free from foreign substances and from barium salts combined therewith.

In practice, of course it is not possible to avoid the introduction of the impurities coming from the carbon electrodes of electric furnaces, but their quantity, which is not higher than 0.5%, does not prevent the oxide from being employed directly, that is, without the necessity of subsequently decanting and filtering the hydroxide solution if any.

In fact, the soluble part, constituted exclusively of barium carbonate, does not disturb the crystallization of the saccharate and is easily recovered in the subsequent filtration of the sugar juice. This makes it possible to eliminate not only the burdensome operation of decanting and filtering the mud, but, above all, the big losses of barium salts in this treatment.

However, since in the long run in the continuous recycling of the oxide and of the carbonate, a concentration of heterogeneous substances would occur, these can be separated by dissolving and filtering only the part of oxide which is needed at any rate for washing and for the uses where baryta water is needed.

The various stages of the process embodying this invention will be described with reference to the accompanying drawing, wherein the single view is a flow diagram of the process.

(1) The molasses coming from the storage tank 1, is pumped into a vessel or reactor 6 equipped with an agitator. The temperature in reactor 6 is brought up to about 70° C., and the caustic alkali and the alkali carbonate are added from storage tanks 2 and 3, respectively, in the quantities and at the concentration as needed to make the non-alkaline mineral salts present precipitate as carbonates. The reaction—owing to the medium in which it takes place—is rather slow and, therefore, after agitating sufficiently, it is convenient to allow the reacting mixture to rest in the vessel 6 for several hours. The carbonates separate gradually and decant. The molasses thus purified are led to the storage tanks which feed the crystallizer, however, passing on the way for the sake of safety, through any filtering means 8.

(2) At the same time, the barium oxide is ground in the crusher 26 and, if needed, sufficiently hydrated in tank 4 to provide the hydroxides with the desired proportion of water. Thus, decarburized barium oxide is obtained, that is, barium oxide combined with one or more molecules of water which, when added to the molasses, dissolves in the water present, or crystals melted in their own water of crystallization or even a solution of barium hydroxide. But the best method of hydrating the already decarburized oxide is to dissolve it in the mother liquor of the saccharate so that one avoids introducing new water of solution and, moreover, barium hydroxide is recovered already in solution.

At any rate, the choice of the best way of operating may depend also on the method of treatment employed, on the reactants chosen for the purification of the molasses, on the dilution attained in this operation, on the apparatus used, on the concentration of the mother liquor obtained and on the purity of the saccharate and on the densities of its suspension in the mother liquors.

It is evident that in the latter suspension there is afforded the limit of maximum concentration possible and although it is important for obvious reasons to have a concentration as high as possible, however, it shall not be such as to render handling impractical.

The conventional apparatus 9 needed for this purpose is different according to whether the continuous and certainly better method is preferred over a discontinuous method. But in the first case as well as in the second case, there are eliminated the previously mentioned inconveniences of the old method, mainly because the formation of the saccharate, which takes place in the saccharate reactor or precipitation apparatus 9 provided with agitating means, no longer requires the presence of the saccharate in coarse granular condition.

By reason of the agitation during formation of the saccharate, the contact between the two fluids is greatly improved and the yield of saccharate is substantially increased. Further, the excess of barium hydroxide required is, in no case, higher than ten percent of the theoretically necessary amount, and it may be even less, so that regeneration of the barium oxide need not be greater than this relatively small excess. Further, the crystallization of the saccharate no longer depends on the quality of the molasses and its granule size, being very small, yields a product of high purity. The separation of the mother liquor and the washing of the saccharate can be carried out with existing devices which are adequate for those purposes, and the sugar juice obtained has a purity higher than 98 percent, which permits the direct obtaining of a very pure sugar. Finally, the plant can be economically operated by reason of the great decrease in labor required for that purpose.

(3) From the saccharate reactor or precipitation apparatus 9, be it continuous or discontinuous, the saccharate is collected and washed on a vacuum filter 10.

Following the slurrying of the saccharate at 14 the saccharate is subjected to the action of carbon dioxide in towers 15 and decomposes into soluble sugar and barium carbonate, which are collected and separated in a filter 16. The light and heavy sugar juices are led from filter 10 to respective reservoirs 21 and 20, while the barium carbonate is led to a drying apparatus 24. The mother liquor led to the tank 11 from the saccharate filter 10 is treated with carbon dioxide in towers 18 and barium precipitates completely therefrom without any further need of adding carbonate solution, thanks to the presence of the residual alkalinity of the purification of molasses. The heavy and light mother liquors separated from the barium carbonate in vacuum filter 19 are led to respective reservoirs 22 and 23, while the barium carbonate from filter 19 is also introduced into the drying apparatus 24.

(4) To all of the barium carbonate of the cycle thus obtained, there is added the carbon needed for reduction, in the form of coal from a hopper 17, and the mixture of barium carbonate and carbon passes through the drying apparatus 24 heated by the gases leaving the kiln or furnace 25 and is introduced directly into the furnace.

The fused oxide, tapped from the kiln 25 at regular intervals, is poured into ingot moulds where it cools down and wherefrom it is directly recycled to the crusher 26, since there are no slag or impurities to be taken off.

*Examples*

*Example 1.*—100 p. of molasses with 48% saccharose are treated at the temperature of 70° C. and under agitation, with a solution containing 4 p. of $K_2CO_3$ and 7 p. of KOH.

*Example 2.*—Treatment as in Example 1, but in lieu of a solution of potassium carbonate and hydrate, to 100 p. of molasses there are added 50 p. of a solution of potassium salt coming from the mother liquor, partly caustified and containing the quantity indicated above of $K_2CO_3$ and of KOH.

*Example 3.*—To 100 p. of molasses purified as in Examples 1 and 2, there are added 16.5 p. of barium oxide. The operation is carried out at 70–80° C. and under good agitation.

*Example 4.*—To the barium oxide of Example 3 there may be added previously 4 p. of water so as to form $Ba(OH)_2.H_2O$, or 16 p. of water so that the oxide be in the form of $Ba(OH)_2.8H_2O$.

*Example 5.*—The barium oxide of Example 3 may be added to the purified molasses, in solution of 24% concentration.

*Example 6.*—The barium oxide of Example 3, at a rate of 15.7 p. for 100 p. of purified molasses, is dissolved in 55 p. of mother liquor.

It is apparent that, with the process according to the present invention there are obtained, in the most simple and rational way, relevant advantages over the method as used at present.

(a) Losses are reduced to chemically and technically admissible limits, that is, to about 4 to 5% of sugar and the same percentage of barium carbonate.

(b) The purity quotient of the sugar juice is about 98%.

(c) The plant and its operation are extremely simplified and brought up to date with a rational use of modern equipment.

(d) Labour is limited in practice to mere supervision of the continuous processing cycle.

(e) The overall expenditure for manufacture of the sugar is reduced to extremely low limits.

(f) Thanks to its simplicity, the process of the invention makes practical the building of small plants with any sugarworks, to complete the output of the latter, viz: to work up the molasses produced daily.

I claim:

1. In a process for extracting sugar from molasses by the addition of barium hydroxide; the initial step of separating from the molasses those salts of metals having insoluble carbonates.

2. In a process for extracting sugar from molasses by the addition of barium hydroxide; the initial step of purifying of the molasses by introducing into the latter an alkali carbonate and a caustic alkali in stoichiometrically sufficient quantity to precipitate the insoluble carbonates of salts of metals originally contained in the molasses, and conventionally separating said insoluble carbonates from the molasses.

3. In a process for extracting sugar from molasses; the steps of introducing into the starting molasses an alkali carbonate and a caustic alkali in stoichiometrically sufficient quantity to precipitate the insoluble carbonates of salts of metals originally contained in the starting molasses, separating said insoluble carbonates from the molasses to obtain the latter in purified form, conventionally extracting barium saccharate from the purified molasses leaving a mother liquor, carbonating said barium saccharate for precipitating barium carbonate from said barium saccharate, calcining the barium carbonate to obtain barium oxide therefrom, and recycling the barium oxide.

4. In a process for extracting sugar from molasses; the steps as in claim 3, wherein the pure barium oxide, as obtained by calcining of the barium carbonate, is recycled to the purified molasses.

5. In a process for extracting sugar from molasses; the steps as in claim 3, wherein the pure barium oxide, as obtained by calcining of the barium carbonate, is recycled back to the purified molasses in the form of barium hydroxide with one to eight molecules of water and its water of crystallization fused in.

6. In a process for extracting sugar from molasses; the steps as in claim 3, wherein the pure barium oxide, as obtained by calcining of the barium carbonate, is hydrated and the hydrate in solution at a concentration higher than 24% is added to the purified molasses.

7. In a process for extracting sugar from molasses; the steps as in claim 3, wherein the pure barium oxide, as obtained by calcining of the barium carbonate, is dissolved in said mother liquor of the crystallization of the saccharate.

8. In a process for extracting sugar from molasses; the steps as in claim 3, further comprising agitating the purified molasses and barium hydroxide mixed therewith during the extracting of barium saccharate from the molasses.

References Cited in the file of this patent

UNITED STATES PATENTS

| | | |
|---|---|---|
| 1,616,168 | Arsem | Feb. 1, 1927 |
| 1,878,144 | Holven | Sept. 20, 1932 |
| 2,075,127 | Mead | Mar. 30, 1934 |
| 2,488,974 | Hrodecky | Nov. 22, 1949 |
| 2,626,878 | Bartz | Jan. 27, 1953 |

FOREIGN PATENTS

| | | |
|---|---|---|
| 16,441 | Great Britain | of 1898 |